US009820615B2

(12) United States Patent
Jin et al.

(10) Patent No.: US 9,820,615 B2
(45) Date of Patent: Nov. 21, 2017

(54) AUTOMATIC DOSING DEVICE

(71) Applicant: Zhuhai Unitech Power Technology Co., Ltd., Guangdong (CN)

(72) Inventors: Shuqiang Jin, Guangdong (CN);
Jiandong Huang, Guangdong (CN);
Feng Wang, Guangdong (CN);
Haiming Du, Guangdong (CN)

(73) Assignee: Zhuhai Unilink Technology Co., Ltd., Guangdong (CN)

( * ) Notice: Subject to any disclaimer, the term of this patent is extended or adjusted under 35 U.S.C. 154(b) by 0 days.

(21) Appl. No.: 15/306,330

(22) PCT Filed: Feb. 13, 2015

(86) PCT No.: PCT/CN2015/073032
§ 371 (c)(1),
(2) Date: Oct. 24, 2016

(87) PCT Pub. No.: WO2015/161713
PCT Pub. Date: Oct. 29, 2015

(65) Prior Publication Data
US 2017/0042383 A1 Feb. 16, 2017

(30) Foreign Application Priority Data

Apr. 25, 2014 (CN) .......................... 2014 1 0171866

(51) Int. Cl.
*A47J 47/01* (2006.01)
*B65B 1/12* (2006.01)
*B65B 1/36* (2006.01)
*B65B 3/12* (2006.01)
*B65B 3/26* (2006.01)

(52) U.S. Cl.
CPC .................. *A47J 47/01* (2013.01); *B65B 1/12* (2013.01); *B65B 1/36* (2013.01); *B65B 3/12* (2013.01); *B65B 3/26* (2013.01)

(58) Field of Classification Search
CPC ... A47J 47/01; B65B 1/12; B65B 3/26; B65B 3/12; B65B 1/36
See application file for complete search history.

*Primary Examiner* — Jason K Niesz
(74) *Attorney, Agent, or Firm* — Warner Norcross & Judd LLP

(57) ABSTRACT

An automatic dosing device is disclosed which comprises a frame on which are disposed a flavoring unit, a flavoring receiving unit and a control unit. The flavoring unit comprises a solid flavoring mechanism and a liquid flavoring mechanism, the solid flavoring mechanism comprising a solid flavoring module and a first drive device, the solid flavoring module being detachably connected to the first drive device, the liquid flavoring mechanism comprising a liquid flavoring module and a second drive device, the liquid flavoring module being detachably connected to the second drive device. Both the first and second drive devices are fixed on the frame and are connected with the control unit, respectively; the flavoring receiving unit receives flavorings from the solid flavoring mechanism and the liquid flavoring mechanism.

32 Claims, 11 Drawing Sheets

AUTOMATIC DOSING DEVICE

CROSS-REFERENCE TO RELATED APPLICATIONS

This application is the National Stage of International Application No. PCT/CN2015/073032, filed on 13 Feb. 2015, which claims priority to and all advantages of Chinese Patent Application No. 201410171866.9, filed on 25 Apr. 2014, the content of which is hereby incorporated by reference.

TECHNICAL FIELD

The invention relates to an automatic cooking apparatus, and specifically to an automatic dosing device.

BACKGROUND

Currently, people are paying more and more attention to the quality of food and drinking. In addition to the preparation of main ingredients (meat, vegetables, etc.) and auxiliary ingredients (ginger, onion, garlic, etc.) as well as the cooking temperature and duration, the preparation of a delicious meal is also significantly related to the addition of various flavorings, including the sequence, amount and timing of flavoring adding, which will all have an influence on the taste of meals.

In the process of cooking, the chef typically adds flavorings manually by his hand, which means a cumbersome process and procedure; when many kinds of flavors are added, the chef may easily forget to add a flavoring, or a flavoring may be wrongly added. What is most likely to occur is mistaking the sequence in which the flavorings are added, thus making the cooking effect of meal not good. Manual adding is typically realized by experience with a spoon and measuring by sight. The grasp of amount differs among people, and the accuracy and consistency is generally not good. Even for an experienced chef, flavoring adding is accomplished by experience and thus a great randomness is unavoidable.

In order to overcome the problems with manual flavoring adding, some auxiliary flavoring throwing devices used for flavorings in cooking have emerged in the market. Such devices can throw flavoring in place of manual adding, and the accuracy in flavoring throwing is improved. In practice, such an auxiliary flavoring throwing device is typically integrated onto a cooking apparatus, cannot operate independently, and is difficult to cooperate with other cooking apparatus. In addition, most of such auxiliary flavoring throwing devices can merely accomplish a single kind of flavoring throwing action, such as salt adding, oil adding or the like, and it is difficult for them to accomplish a complicated flavoring formulating operation.

SUMMARY

The invention aims to provide an automatic dosing device, of which a solid flavoring module and a liquid flavoring module are of detachable split-up structure, are convenient and quick to replace and clean, and can be compatibly used with various cooking apparatuses.

In order to address the above technical problem, the invention provides the following technical solution: an automatic dosing device, comprising a frame on which are disposed a flavoring unit, a flavoring receiving unit and a control unit, wherein the flavoring unit comprises a solid flavoring means and a liquid flavoring means, the solid flavoring means comprises a solid flavoring module and a first drive device, the solid flavoring module is detachably drivingly connected to the first drive device, the first drive device is fixed on the frame and is communicatively connected with the control unit; wherein the solid flavoring module comprises a first flavoring bottle and a first base that are in communicative abutment with each other, a flavoring pushing device is provided in the first base and is detachably drivingly connected to the first drive device; when driven by the first drive device, the flavoring pushing device delivers solid flavoring to an outlet of the solid flavoring;

the liquid flavoring means comprises a liquid flavoring module and a second drive device, the liquid flavoring module is detachably drivingly connected to the second drive device, the second drive device is fixed on the frame and is communicatively connected with the control unit; wherein the liquid flavoring module comprises a second flavoring bottle and a second base that are in communicative abutment with each other, a liquid passage, a valve and a drive rod are provided inside the second base, wherein the drive rod is detachably drivingly connected to the second drive device and drives the valve to operate so as to control on-off of the liquid passage;

the flavoring receiving unit receives flavorings from the solid flavoring means and the liquid flavoring means respectively.

Further, a power input shaft of the flavoring pushing device is provided with a first abutment piece, a power output shaft of the first drive device is provided with a second abutment piece, and the first abutment piece and the second abutment piece are detachably abutted with each other.

Further, one of the first abutment piece and the second abutment piece is a rotating shaft having external spline, the other one is a sleeve having internal spline, and the rotating shaft and the sleeve are detachably sleeved over each other.

Further, the first base is provided with an agitating cavity and a pushing cavity, the flavoring pushing device comprises an agitating element and a helical pusher, the agitating element is located in the agitating cavity, the helical pusher is located in the pushing cavity, the agitating cavity is in communication with the first flavoring bottle, and the pushing cavity is in communication with the agitating cavity; solid flavoring enters the agitating cavity from the first flavoring bottle, and enters the pushing cavity after being agitated and dispersed by the agitating element; in the pushing cavity, when pushed by the helical pusher, the solid flavoring is delivered to the outlet of solid flavoring.

Further, a coupling member is located between the agitating element and the helical pusher, and is in the form of gear transmission or belt transmission.

Further, the pushing cavity has a column shape structure that mates with the shape of the helical pusher; an outer edge of the helical pusher is close to an inner wall of the pushing cavity, and said edge and said inner wall are in a tangent relationship.

Further, a mouth section at the bottom of the first flavoring bottle is detachably and rotatably snap-fitted to a base socket of the first base, wherein a projecting strip is disposed circumferentially on an outside face of the mouth section, and a positioning rib is disposed at an end of the projecting strip, a L-shaped snapping slot is provided in the base socket, the L-shaped snapping slot comprises an axial portion and a circumferential portion, the axial portion extends from the edge of the base socket in a direction in which the mouth section is inserted into the base socket, and the circumferential portion extends from a side face edge of the axial portion in a circumferential direction of the base socket; when the mouth section rotates and snap-fits with the base socket, the projecting strip screws into the circumferential portion of the L-shaped snapping slot; and when the mouth section rotates and firmly snap-fits with the base socket, the positioning rib abuts against the side face edge of the circumferential portion of the L-shaped snapping slot.

Further, the frame is fixedly provided with a quick release joint used for communicative insertion connection with the outlet of the liquid flavoring.

Further, the drive rod is provided with a third abutment member, the second drive device is provided with a fourth abutment member, and the third abutment member and the fourth abutment member are detachably abutted with each other.

Further, the third abutment member is disposed at a bottom portion of the second base, and the outlet of the liquid flavorings faces a back side of the second base; when the outlet of the liquid flavoring is insertedly connected to the quick release joint, the third abutment member and the fourth abutment member mate and abut with each other.

Further, the third abutment member is a C-shaped pulling hook, the fourth abutment member is a T-shaped pulling disc, and the T-shaped pulling disc is detachably embeddedly disposed in a C-shaped slot of the C-shaped pulling hook; a direction in which the T-shaped pulling disc is embedded into the C-shape pulling hook is consistent with a direction in which the outlet of the liquid flavoring is insertedly connected with the quick release joint.

Further, the second drive device is a push-pull electromagnet, an end of the drive rod is detachably drivingly connected to the push-pull electromagnet, and the other end of the drive rod is fixedly connected to the valve.

Further, the second flavoring bottle and the second base are in detachable sealing screw snap-fit connection, and an elastic washer is provided at the snap-fit portion of the second flavoring bottle and the second base.

Further, there are a plurality of the solid flavoring means, the flavoring receiving unit has a first flavoring receiving device for receiving solid flavoring, and the first flavoring receiving device is slidably disposed on the frame.

Further, a third drive device is disposed on the frame, and the third drive device drives the first flavoring receiving device to slide on a sliding track.

Further, the first flavoring receiving device comprises a flavoring receiving cup, a bracket and a tray, the bracket slides on the sliding track when driven by the third drive device, the tray is disposed on the bracket, and the flavoring receiving cup is placed in the tray.

Further, a metering module is provided between the tray and the bracket, and the tray and the bracket are arranged in clearance fit; when there is no flavoring in the flavoring receiving cup, the bottom of the tray does not contact the metering module.

Further, the solid flavoring means are arranged in a linear array in the horizontal direction or in an arc array in the horizontal plane on the frame, wherein the arrangement of the sliding track on the frame mates with the arrangement of the solid flavoring means.

Further, the first flavoring receiving device has an initial position on the sliding track, and a sensor for detecting the position of the first flavoring receiving device is disposed at the initial position.

Further, the frame is provided with a first lateral plate and a second lateral plate that are parallel with each other, the solid flavoring module is clamped between the first lateral plate and the second lateral plate, and a riser plate perpendicular to the first lateral plate and the second lateral plate is further provided between the first lateral plate and the second lateral plate; the solid flavoring module and the first drive device are separated at two sides of the riser plate, and the riser plate is provided with a shaft hole for abutting the solid flavoring module with the first drive device.

Further, an elastic telescopic sliding element is provided at a portion where the first lateral plate contacts with the solid flavoring module, and the elastic telescopic sliding element is disposed on the first lateral plate and/or at the bottom of the solid flavoring module.

Further, each of the solid flavoring means is provided with a label for recording flavoring information, the frame is provided with a scanning unit for acquiring the flavoring information on the label, and a displacement unit for driving the scanning unit to move, and the scanning unit and the displacement unit are communicatively connected with the control unit respectively.

Further, the displacement unit comprises a displacement support and the third drive device, the scanning unit is fixed on the displacement support, and the third drive device drives the scanning unit and the first flavoring receiving device to move synchronously.

Further, there are a plurality of liquid flavoring means, the flavoring receiving unit has a second flavoring receiving device for receiving liquid flavoring, the liquid flavoring means delivers liquid flavoring into the second flavoring receiving device through a liquid flavoring pipe; a gas pump and a first control valve are sequentially arranged at a front section of the liquid flavoring pipe; the outlet of each liquid flavoring means is in communication with a middle section of the liquid flavoring pipe respectively; and a first liquid pump and a second control valve are sequentially arranged at a rear section of the liquid flavoring pipe.

Further, at least one said solid flavoring means is further disposed above the second flavoring receiving device, and solid flavoring in the solid flavoring means can fall into the second flavoring receiving device.

Further, the second flavoring receiving device comprises a flavoring receiving cup, a rotating base and a fourth drive device, the flavoring receiving cup is disposed on the rotating base, and the fourth drive device drives the rotating base to rotate.

Further, a water inflow branch is further provided at the front section of the liquid flavoring pipe, and a third control valve is provided in the water inflow branch.

Further, a waste liquid opening and a fourth control valve are sequentially arranged at a rear section of the liquid flavoring pipe, and the waste liquid opening communicates with an output end of the first liquid pump via the fourth control valve.

Further, the first liquid pump is a plunger pump.

Further, each of the liquid flavoring means is provided with a label for recording flavoring information, the frame is provided with a scanning unit for acquiring the flavoring information on the label, and a displacement unit for driving the scanning unit to move, and the scanning unit and the displacement unit are communicatively connected with the control unit respectively.

Further, an oil pipe for delivering edible oil is also included, and the flavoring receiving unit has a third flavoring receiving device for receiving the edible oil; a second liquid pump and a fifth control valve are sequentially arranged on the oil pipe, and the second liquid pump is a plunger pump or a gear pump.

Further, the frame is provided with a manual switch or a sensing switch for controlling the actions of the solid flavoring means and/or the liquid flavoring means, and the manual switch or the sensing switch is communicatively connected to the control unit.

The invention brings about the following advantageous technical effects: the automatic dosing device according to the invention integrates the solid flavoring means and the liquid flavoring means, and meanwhile the solid flavoring module is detachably drivingly connected to the first drive device, and the liquid flavoring module is detachably drivingly connected to the second drive device; the first drive device and the second drive device are fixed on the frame, and the solid flavoring module and the liquid flavoring module are of a detachable split-up structure so that a disassembling operation of the solid flavoring module and the liquid flavoring module is made flexible and convenient, thus achieving the advantageous effect of convenient and quick replacing and cleaning. In addition, depending on different kinds of flavorings required by different cooking apparatuses, the automatic dosing device according to the invention can replace and adjust corresponding solid flavoring module and liquid flavoring module quickly, and the compatibility of the automatic dosing device with different cooking apparatuses is improved.

BRIEF DESCRIPTION OF THE DRAWINGS

The accompanying drawings, which constitute a part of the invention, provide a further understanding of the invention. The exemplary embodiments of the invention and a description thereof are provided for explaining the invention, and do not constitute an inappropriate restriction to the invention; in the drawings.

LIST OF REFERENCE SIGNS 10 frame; 11 first lateral plate; 12 second lateral plate; 13 riser plate; 14 shaft hole; 15 elastic telescopic sliding element; 20 solid flavoring means; 21 solid flavoring module; 211 first flavoring bottle; 2111 projecting strip; 2112 L-shaped snapping slot; 2113 axial portion; 2114 circumferential portion; 2115 positioning rib; 212 first base; 213 flavoring pushing device; 214 first abutment piece; 215 agitating element; 2151 agitating cavity; 216 helical pusher; 2161 pushing cavity; 217 coupling member; 218 outlet of solid flavoring; 22 first drive device; 221 second abutment piece; 23 third drive device; 24 sliding track; 30 liquid flavoring means; 31 liquid flavoring module; 311 second flavoring bottle; 312 second base; 313 liquid passage; 314 valve; 315 drive rod; 316 third abutment piece; 317 quick release joint; 318 outlet of liquid flavoring; 319 elastic washer; 32 second drive device; 321 fourth abutment piece; 34 liquid outlet; 40 control unit; 50 flavoring receiving unit; 51 first flavoring receiving device; 52 second flavoring receiving device; 53 third flavoring receiving device; 54 flavoring receiving cup; 55 bracket; 56 tray; 57 metering module; 58 rotating base; 60 liquid flavoring pipe; 61 gas pump; 62 first control valve; 63 first liquid pump; 64 second control valve; 65 water inflow branch; 651 water inlet; 66 third control valve; 67 fourth control valve; 68 waste liquid opening; 70 oil pipe; 71 second liquid pump; 72 fifth control valve; 73 oil outlet; 74 oil inlet; 80 scanning unit; 90 displacement unit; 91 displacement support.

DETAILED DESCRIPTION OF THE EMBODIMENTS

Specific embodiments of the invention will be described in detail below with reference to the accompanying drawings. Nevertheless, the invention can be carried out in various different ways defined and covered by the appended claims.

Figure 1:
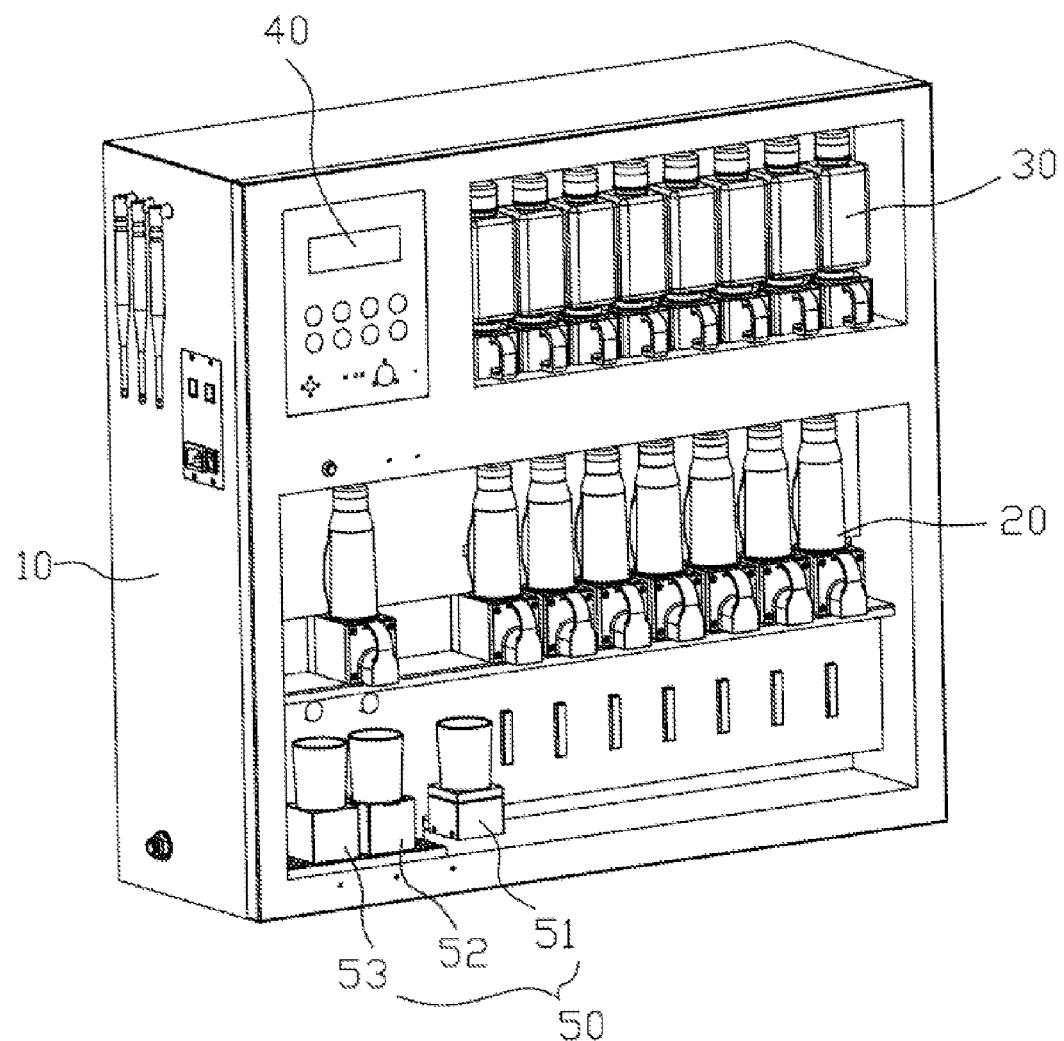
FIG. 1 is a schematic perspective view showing the structure of the automatic dosing device according to the invention.

As shown in FIG. 1, the invention provides an automatic dosing device, which comprises a frame 10 having a flavoring unit, a flavoring receiving unit 50 and a control unit 40 provided thereon, and the flavoring unit has flavoring containing devices in two physical forms, i.e., a solid flavoring means 20 and a liquid flavoring means 30, wherein the solid flavorings contained in the solid flavoring means 20 can be salt, sugar, monosodium glutamate, starch, etc., and the liquid flavorings contained in the liquid flavoring means 30 can be soy, vinegar, oyster sauce, etc. The control unit 40 is a control center of the automatic dosing device, and controls other components of the automatic dosing device according to control commands that are preset or input from outside. In another embodiment, the control unit 40 is disposed at an upper left corner of the front face of the frame 10. The control unit 40 is provided with a display screen and keys for users to view and configure parameters and operating status.

As shown in FIGS. 4 to 9, the solid flavoring means 20 comprises a solid flavoring module 21 and a first drive device 22, the solid flavoring module 21 is detachably drivingly connected to the first drive device 22 which is fixed on the frame 10 and communicatively connected to the control unit 40, wherein the solid flavoring module 21 comprises a first flavoring bottle 211 and a first base 212 that communicatively abut with each other. A flavoring pushing device 213 is provided inside the first base 212 and is detachably drivingly connected to the first drive device 22; when driven by the first drive device 22, the flavoring pushing device 213 agitates solid flavorings from the first flavoring bottle 211 and delivers agitated solid flavorings to the outlet 218 of solid flavorings. The above design enables the solid flavoring module 21 to have a detachable split-up structure, and replacing and cleaning operations on the solid flavoring module 21 are thus made very convenient and quick.

As shown in FIGS. 10 to 13, the liquid flavoring means 30 comprises a liquid flavoring module 31 and a second drive device 32, the liquid flavoring module 31 is detachably drivingly connected to the second drive device 32 which is fixed on the frame 10 and communicatively connected to the control unit 40, wherein the liquid flavoring module 31 comprises a second flavoring bottle 311 and a second base 312 that communicatively abut with each other; a liquid passage 313, a valve 314 and a drive rod 315 are provided inside the second base 312, the drive rod 315 is detachably drivingly connected to the second drive device 32 and drives the valve 314 so as to control on-off of the liquid passage 313, thus realizing outflow of liquid flavoring from the second flavoring bottle 311. Similar to the solid flavoring module 21, the above design enables the liquid flavoring module 31 to have a detachable split-up structure, and replacing and cleaning operations on the liquid flavoring module 31 are also made very convenient and quick.

As shown in FIG. 1, the flavoring receiving unit 50 is provided with a first flavoring receiving device 51 and a second flavoring receiving device 52 for receiving flavorings from the solid flavoring means 20 and the liquid flavoring means 30 respectively.

Figure 6:
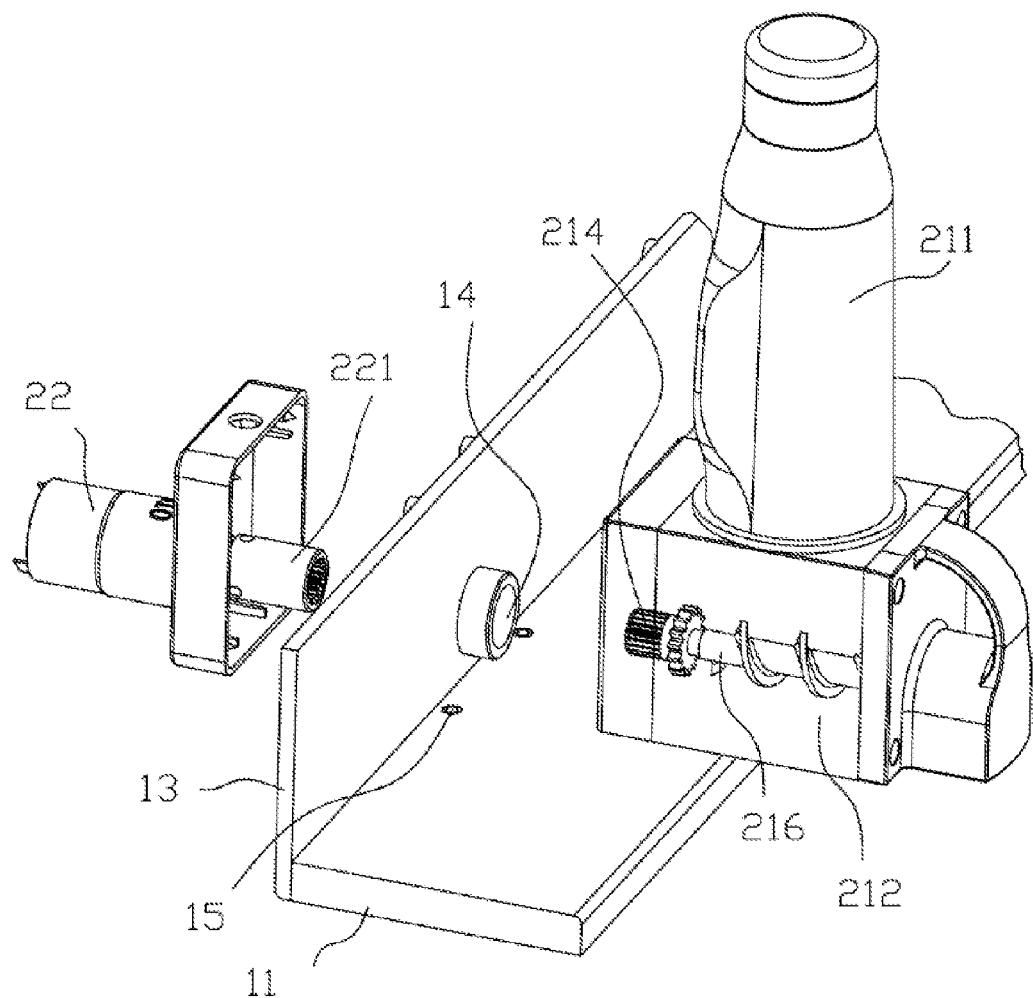
FIG. 6 is an exploded view of the elements and components of the solid flavoring means of the invention.

As shown in FIG. 6, in another embodiment, a power input shaft of the flavoring pushing device 213 is provided with a first abutment piece 214, a power output shaft of the first drive device 22 is provided with a second abutment piece 221, and the first abutment piece 214 and the second abutment piece 221 are detachably abutted with each other. Preferably, one of the first abutment piece 214 and the second abutment piece 221 is a rotating shaft having external spline, the other one is a sleeve having internal spline, and the rotating shaft and the sleeve are detachably sleeved over each other.

Figure 7:
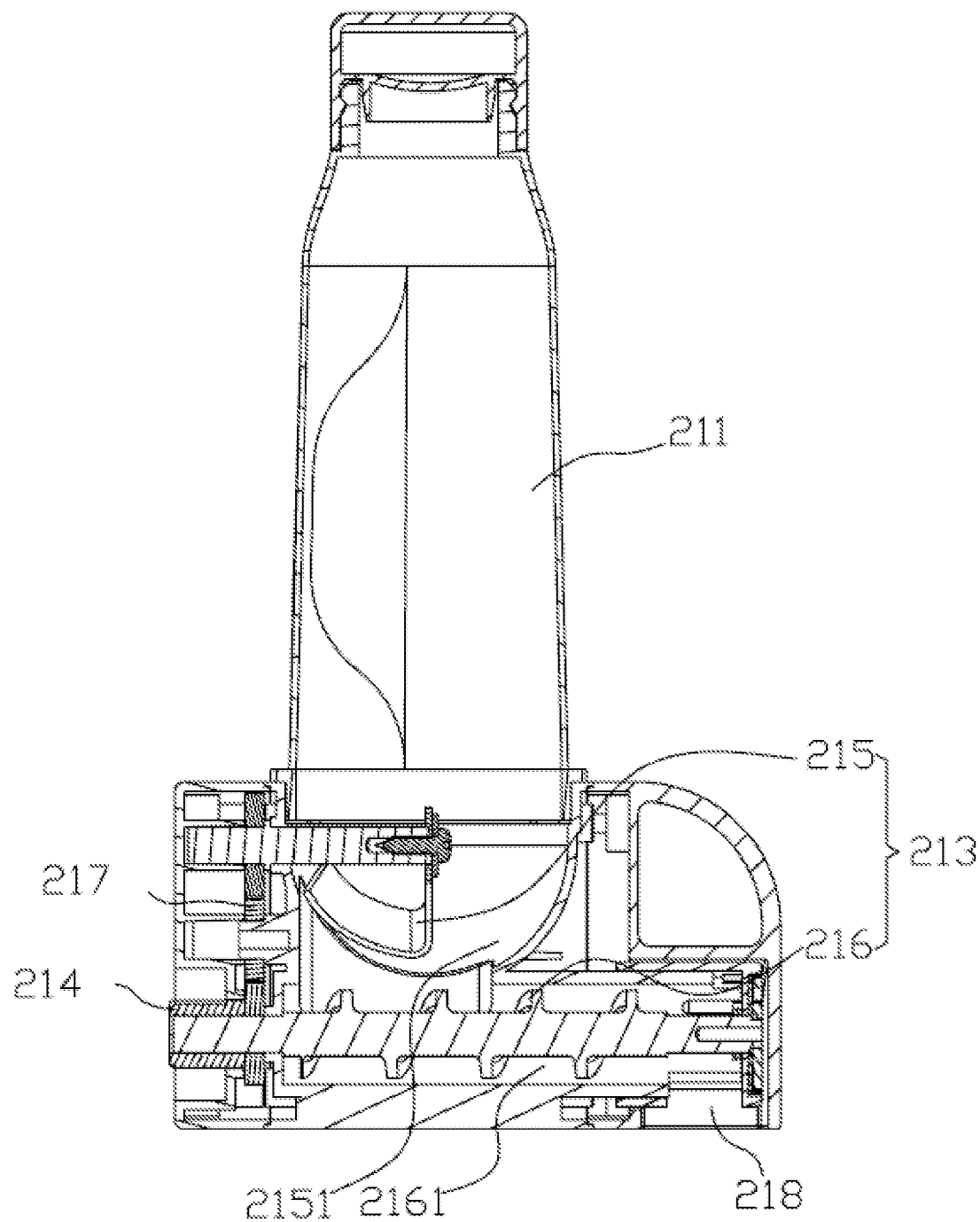
FIG. 7 is a sectional view of the solid flavoring means of the invention.
Figure 8:
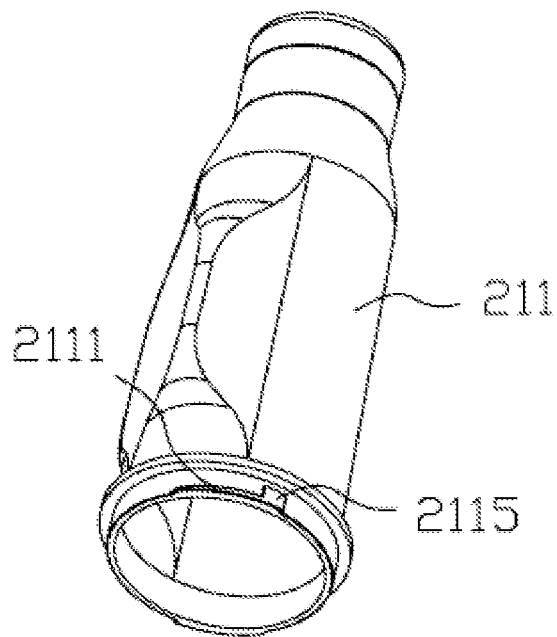
FIG. 8 is a schematic view showing the structure of the first flavoring bottle of the invention.

As shown in FIGS. 6 and 7, in another embodiment, the first base 212 is provided therein with an agitating cavity 2151 and a pushing cavity 2161, the flavoring pushing device 213 comprises an agitating element 215 and a helical pusher 216, the agitating element 215 is located in the agitating cavity 2151, and the helical pusher 216 is located in the pushing cavity 2161. The agitating cavity 2151 is located under the first flavoring bottle 211, the pushing cavity 2161 is located under the agitating cavity 2151, the agitating cavity 2151 is in communication with the first flavoring bottle 211, and the pushing cavity 2161 is in communication with the agitating cavity 2151. Solid flavorings enter the agitating cavity 2151 from the first flavoring bottle 211, and enter the pushing cavity 2161 after being agitated and dispersed by the agitating element 215; in the pushing cavity 2161, when pushed by the helical pusher 216, the solid flavorings are delivered to the outlet 218 of solid flavorings.

A coupling member 217 is located between the agitating element 215 and the helical pusher 216, and is in the form of gear transmission or belt transmission. The first drive device 22 is a varying speed motor which drives the helical pusher 216 to rotate, and the helical pusher 216 drives the agitating element 215 to operate accordingly.

The agitating element 215 agitates and disperses solid flavorings from the first flavoring bottle 211 so that flavoring particles delivered from the solid flavoring means 20 is small, thus avoiding agglomeration of solid flavorings and affecting dosing accuracy, which indirectly ensures the accuracy of flavorings received by the first flavoring receiving device 51. The helical pusher 216 pushes agitated and dispersed solid flavorings to the outlet 218 of the solid flavorings. In addition, the first drive device 22 is a varying speed motor. The operator can adjust the speed of discharging the flavoring as actually required, thus further ensuring the accuracy of discharging solid flavorings. Moreover, if the particles of solid flavoring are uniform and in case that dryness is ensured, in other embodiments, no agitating device is required to be provided in the flavoring pushing device 213, and only a pushing mechanism is required to be provided. In this way, the above described technical effect can be still achieved, while also reducing the number of elements and components and reducing device cost, and indirectly improving working efficiency.

In addition, the pushing cavity 2161 has a column shape structure that mates with the shape of the helical pusher 216; the helical pusher 216 is close to an inner wall of the pushing cavity 2161, but is not in contact with the inner wall; rather, they are in a tangent relationship. With this design, solid flavorings can be prevented from being adhered to the surface of the inner wall of the pushing cavity 2161, thus ensuring the accuracy of discharging solid flavorings.

In this embodiment, the flavoring pushing device 213 uses the helical pusher 216. For those skilled in the art, depending on functional requirements on flavoring pushing, the flavoring pushing device 213 is not limited to using the mere form of helical pusher 216. For example, a pushing rod can be also used. In order to improve flavoring pushing effect, a pushing block can be also disposed at a front end of the pushing rod.

Figure 9:
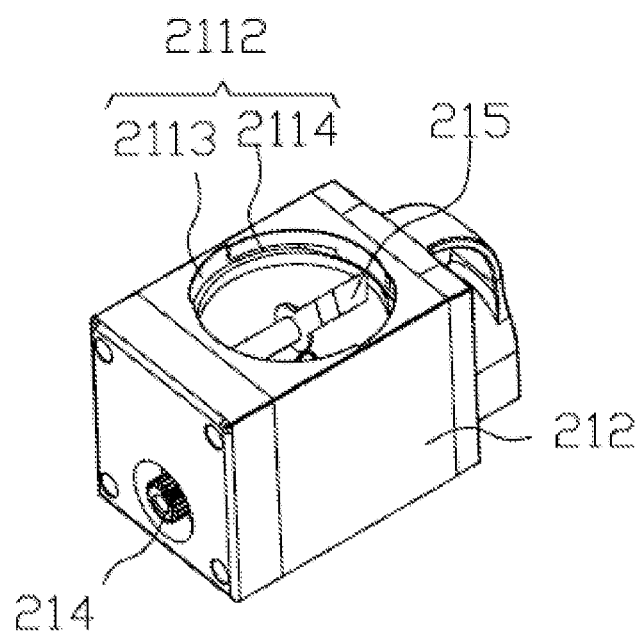
FIG. 9 is a schematic view showing the structure of the first base of the invention.

As shown in FIG. 9, in another embodiment, a mouth section at the bottom of the first flavoring bottle 211 is detachably and rotatably snap-fitted to a base socket of the first base 212, wherein a projecting strip 2111 is disposed circumferentially on an outside face of the mouth section, and a positioning rib 2115 is disposed at an end of the projecting strip 2111; a L-shaped snapping slot 2112 is provided in the base socket, and the L-shaped snapping slot 2112 comprises an axial portion 2113 and a circumferential portion 2114, wherein the axial portion 2113 extends from the edge of the base socket in a direction in which the mouth section is inserted into the base socket, and the circumferential portion 2114 extends from a side face edge of the axial portion 2113 in a circumferential direction of the base socket; when the mouth section rotates and snap-fits with the base socket, the projecting strip 2111 screws into the circumferential portion 2114 of the L-shaped snapping slot 2112; and when the mouth section rotates and firmly snap-fits with the base socket, the positioning rib 2115 abuts against the side face edge of the circumferential portion 2114 of the L-shaped snapping slot 2112. The projecting strip 2111 and the positioning rib 2115 enable the first flavoring bottle 211 and the L-shaped snapping slot 2112 in the first base 212 to be detachably and rotatably snap-fitted firmly, thus facilitating replacing and cleaning the first flavoring bottle 211, while also facilitating removing the internal scales in the first base 212. Moreover, since only mechanical elements are present in the first base 212 and there are no electrical elements in the first base 212, when cleaning the first base 212, there is no need to consider the sealing, safety and service life of the electrical elements.

Figure 10:
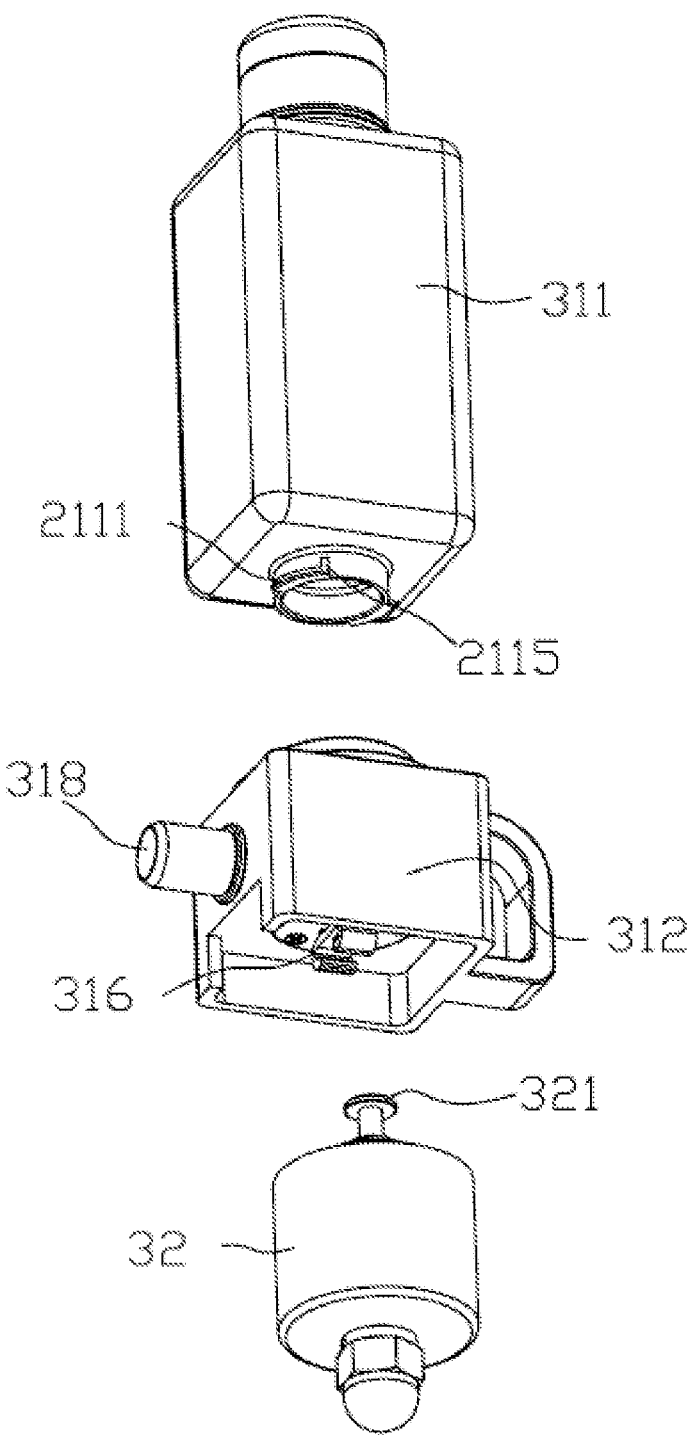
FIG. 10 is an exploded view of the elements and components of the liquid flavoring means of the invention.
Figure 12:
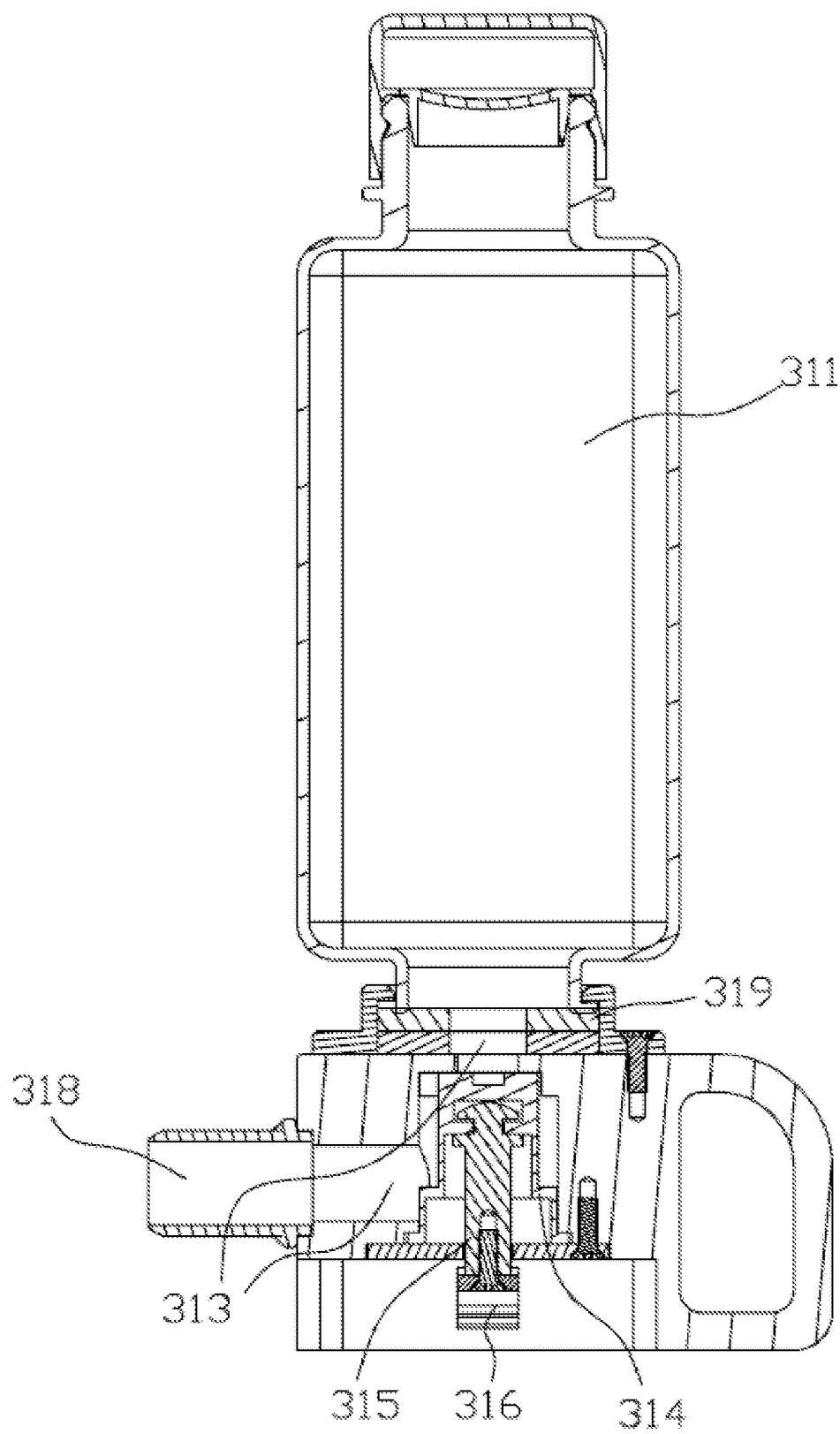
FIG. 12 is a sectional view of the liquid flavoring module of the invention.
Figure 13:
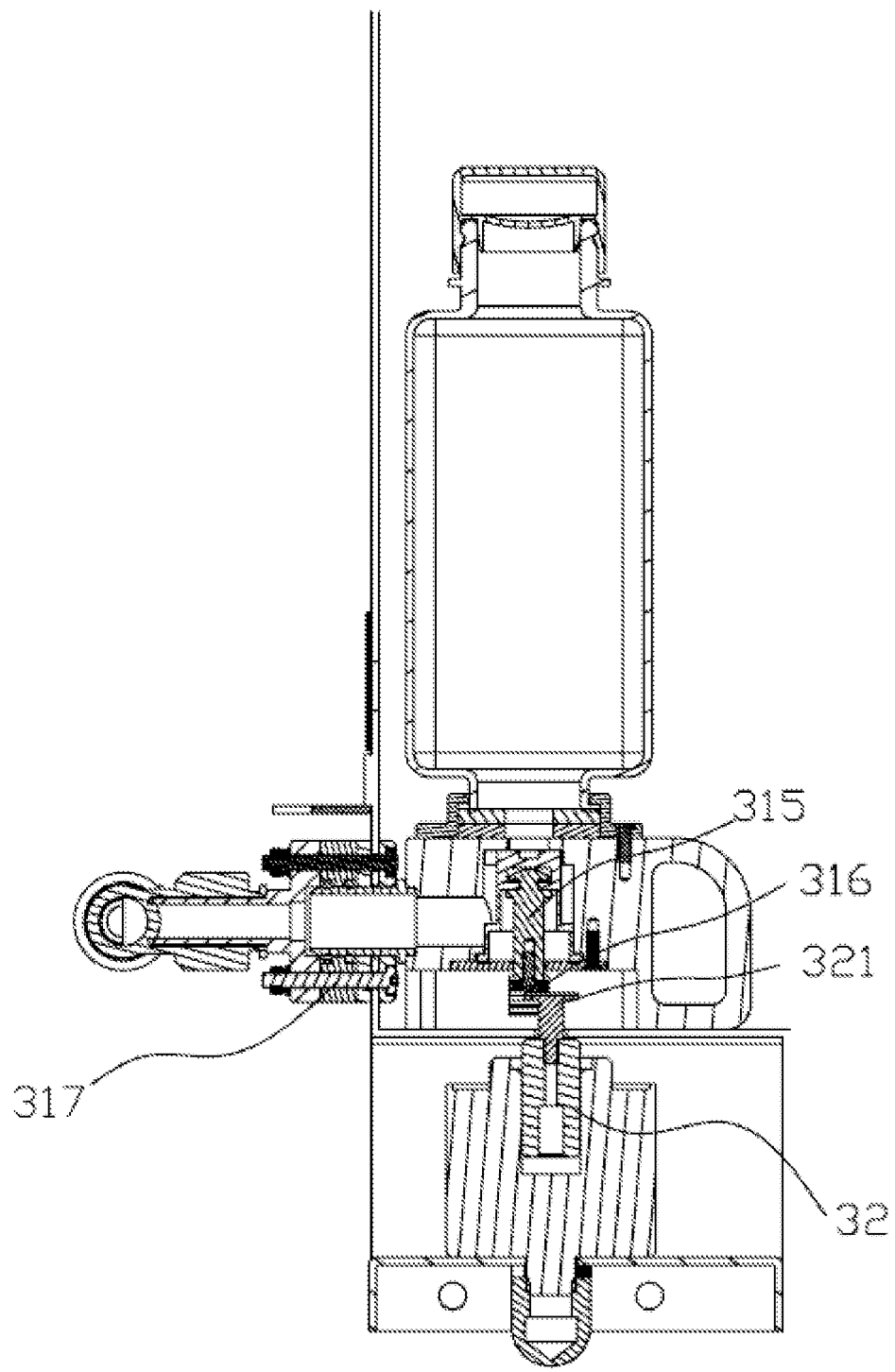
FIG. 13 is a sectional view of the liquid flavoring means of the invention.

As shown in FIGS. 10, 12 and 13, in another embodiment, the frame 10 is fixedly provided with a quick release joint 317 used for communicative insertion connection with the outlet 318 of the liquid flavorings. The drive rod 315 is provided with a third abutment member 316, the second drive device 32 is provided with a fourth abutment member 321, and the third abutment member 316 and the fourth abutment member 321 are detachably abutted with each other.

The third abutment member 316 is disposed at a bottom portion of the second base 312, and the outlet 318 of the liquid flavorings faces a back side of the second base 312; when the outlet 318 of the liquid flavorings is insertedly connected to the quick release joint 317, the third abutment member 316 and the fourth abutment member 321 mate and abut with each other. Preferably, the third abutment member 316 is a C-shaped pulling hook, the fourth abutment member 321 is a T-shaped pulling disc, and the T-shaped pulling disc is detachably embeddedly disposed in a C-shaped slot of the C-shaped pulling hook; a direction in which the T-shaped pulling disc is embedded into the C-shape pulling hook is consistent with a direction in which the outlet 318 of the liquid flavorings is insertedly connected with the quick release joint 317. The quick release joint 317 is detachably insertedly connected with the outlet 318 of the liquid flavoring, and the C-shaped pulling hook is detachably snap-fitted with the T-shaped pulling disc. Therefore, on the basis of realizing a quick clutch function of the liquid flavoring module 31 and the second drive device 32, the reliability of detachably fixing the liquid flavoring module 31 onto the frame 10 can be improved. In this embodiment, preferably, the second drive device is a push-pull electromagnet, an end of the drive rod 315 is detachably drivingly connected to the push-pull electromagnet, and the other end of the drive rod 315 is fixedly connected to the valve 314. As compared to cylinder propulsion and screw propulsion, the control unit 40 can control power-on of the push-pull electromagnet, thus controlling the outflow amount of liquid flavoring in the liquid flavoring module 31 more accurately. Of course, in other embodiments, in case that the accuracy requirement on the outflow amount of liquid flavoring is not high, such driving forms as cylinder propulsion or screw propulsion may be also used as equivalent substitute means in order to realize a corresponding function.

Figure 11:
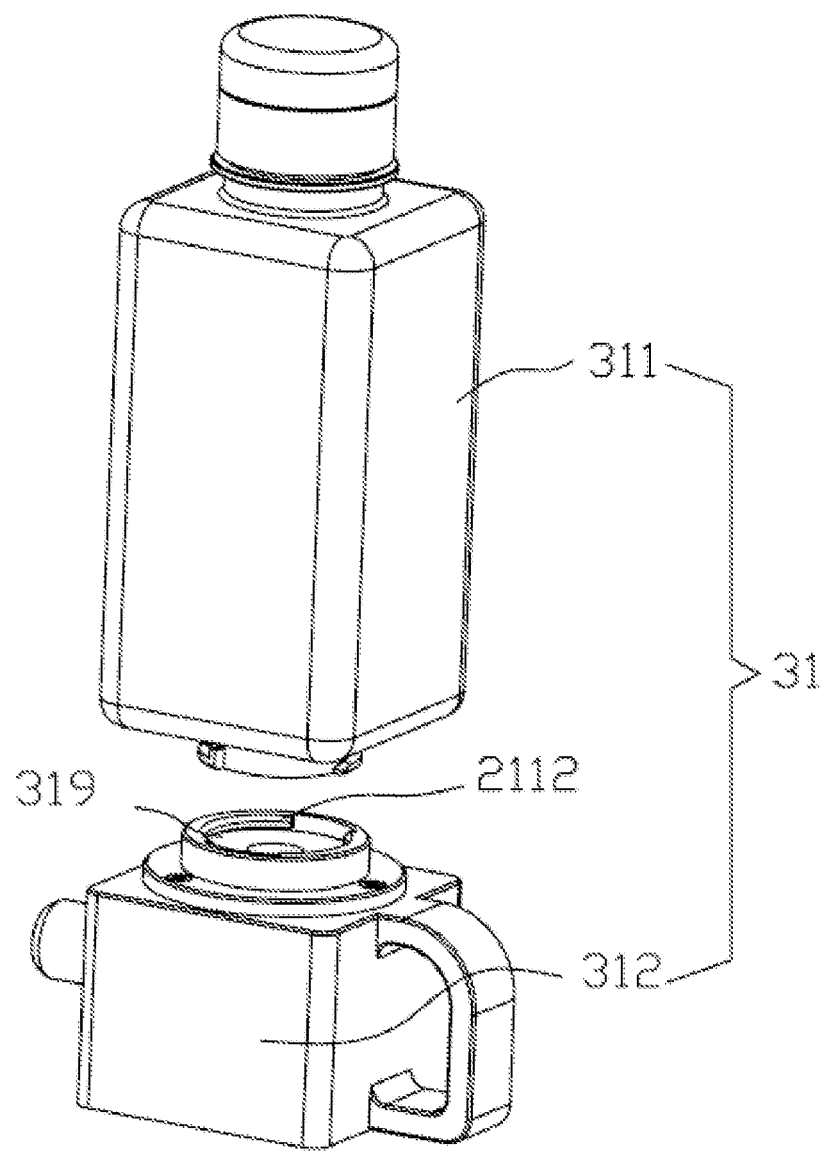
FIG. 11 is an exploded view of the liquid flavoring module of the invention.

As shown in FIGS. 10 and 11, in another embodiment, similar to the fitting relationship between the first flavoring bottle 211 and the first base 212, the second flavoring bottle 311 and the second base 312 can be also in detachable sealing screw snap-fit connection, and an elastic washer 319 is provided at the snap-fit portion of the second flavoring bottle 311 and the second base 312. In view of the fact that the second flavoring bottle 311 contains liquid flavoring, a higher sealability requirement is imposed than the solid flavoring. Therefore, in a configuration where the second flavoring bottle 311 and the second base 312 are detachably connected, the sealability requirement is improved. That is, in this embodiment, the elastic washer 319 is used to improve the sealability at the contact position.

Figure 2:
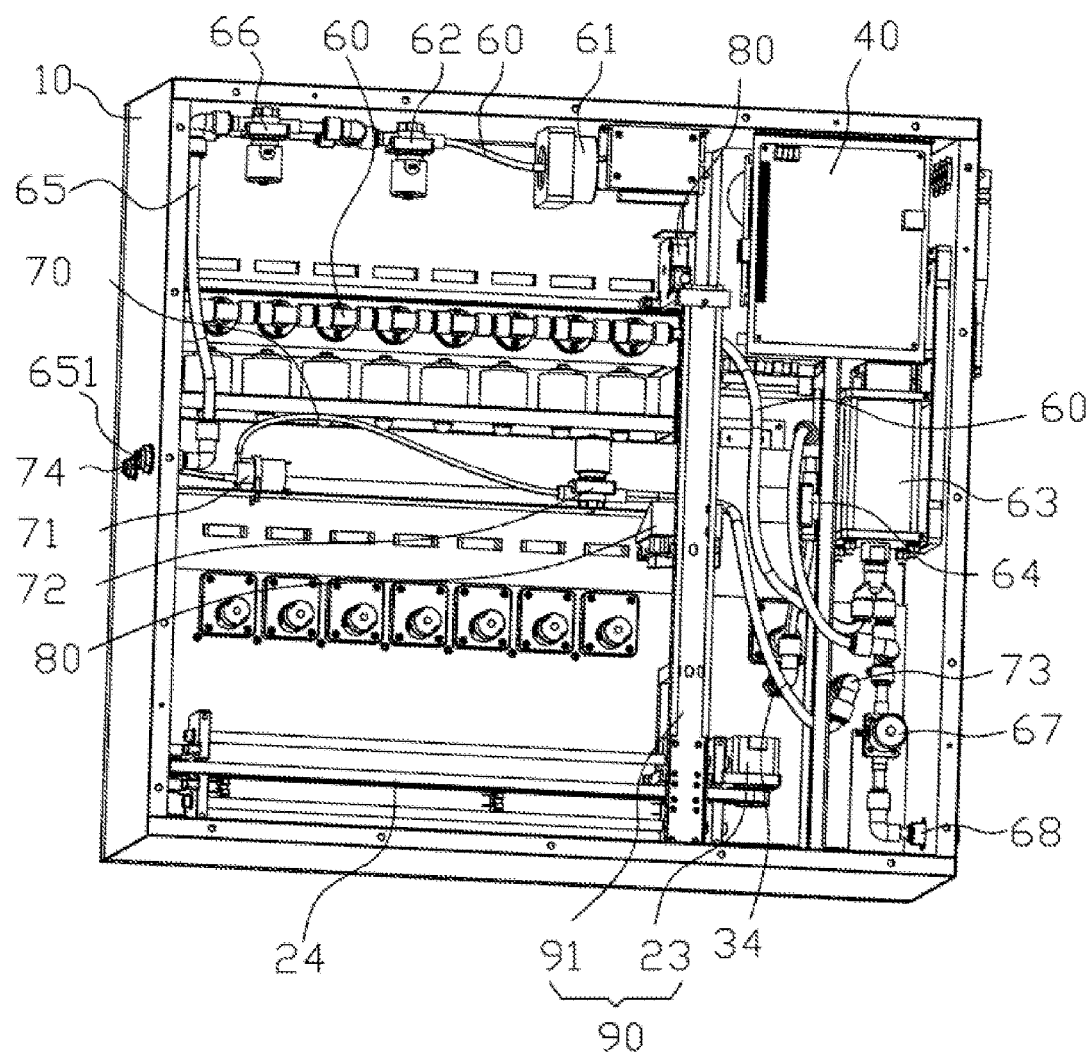
FIG. 2 is a schematic perspective view showing an internal structure of the automatic dosing device according to the invention.

As shown in FIGS. 1 and 2, in another embodiment, there are a plurality of the solid flavoring means 20, which can contain different solid flavorings simultaneously. The plurality of solid flavoring means 20 are arranged in a linear array in the horizontal direction on the frame 10. Similar to the linear array, the plurality of solid flavoring means 20 may also be arranged in a curve like array in the horizontal direction, such as an arc array. Of course, the above arrangement may be also adjusted according to an internal structure and an external environment of the automatic dosing device.

The flavoring receiving unit 50 has a first flavoring receiving device 51 for receiving solid flavorings, and the first flavoring receiving device 51 is slidably disposed on the frame 10. A third drive device 23 is disposed on the frame 10, and the third drive device 23 drives the first flavoring receiving device 51 to slide on a sliding track 24, wherein the arrangement of the sliding track 24 is adapted to the arrangement of the solid flavoring means 20 on the frame 10. For example, if the solid flavoring means 20 are arranged in a linear array, the sliding track 24 will also be arranged in a linear array. With this design, the first flavoring receiving device 51 can move to a position under the outlet 318 of a designated solid flavoring means when driven by the third drive device 23 according to a control command sent from the control unit 40, and wait to receive solid flavoring, thus realizing automatic flavoring discharging and automatic flavoring receiving.

In addition, after the automatic flavoring receiving is finished, the control unit 40 sends a reverse control signal to the third drive device 23 to make the third drive device 23 operate in a reverse direction so that the first flavoring receiving device 51 returns to its initial position, and the entire automatic dosing process is finished. A sensor for detecting the position of the first flavoring receiving device 51 is provided at the initial position for improving the accuracy of automatic flavoring receiving.

Figure 3:
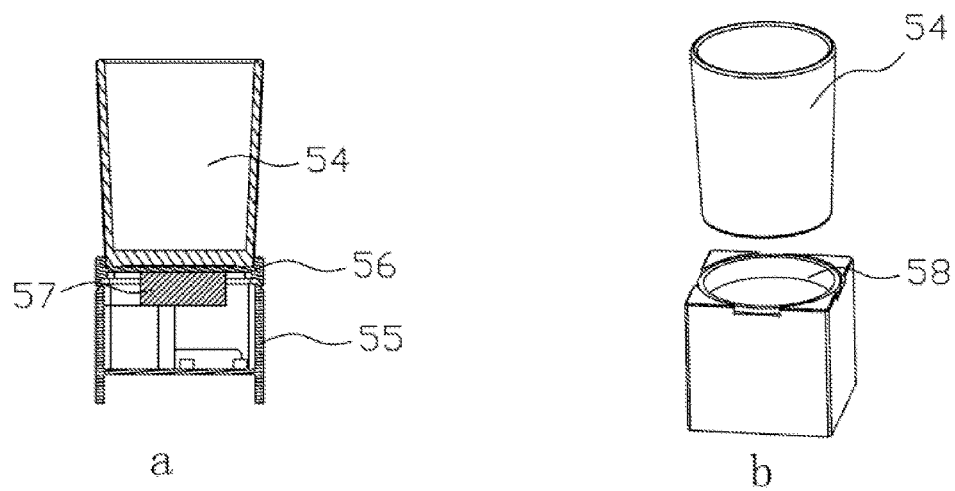
FIG. 3a is a sectional view of the first flavoring receiving device of the invention.
FIG. 3b is a schematic perspective view showing the structure of the second flavoring receiving device of the invention.
Figure 4:
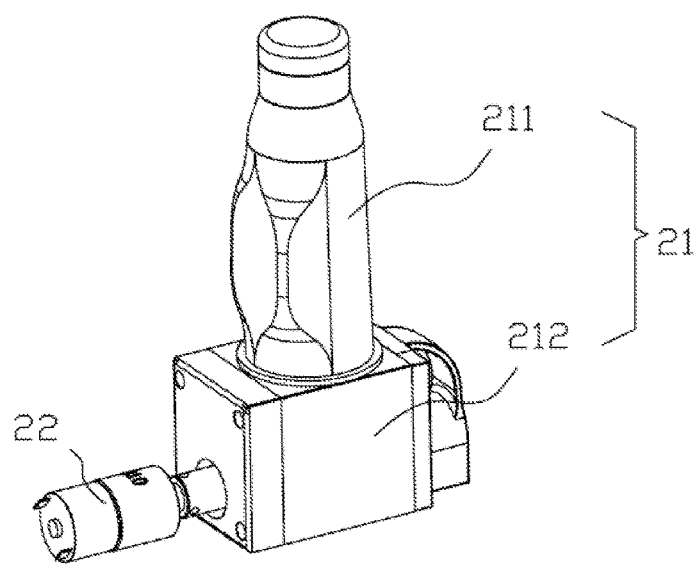
FIG. 4 is a schematic perspective view showing the structure of the solid flavoring means of the invention.

As shown in FIG. 3a, the first flavoring receiving device 51 comprises a flavoring receiving cup 54, a bracket 55 and a tray 56, the bracket 55 slides on the sliding track 24 when driven by the third drive device 23, the tray 56 is disposed on the bracket 55, and the flavoring receiving cup 54 is placed in the tray 56. A metering module 57 is provided between the tray 56 and the bracket 55, and the tray 56 and the bracket 55 are arranged in clearance fit; when there are no flavorings in the flavoring receiving cup 54, the bottom of the tray 56 does not contact the metering module 57. With such a design, the metering result of the metering module 57 is accurate. In this embodiment, the metering module 57 is a pressure sensor which transmits a pressure signal to the control unit 40, and the control unit 40 processes the pressure signal and outputs corresponding metering information.

In this embodiment, the flavoring receiving cup 54 and the tray 56 are separable. After a certain quantity of flavoring is received, the user can take the flavoring receiving cup 54 directly and pour the flavoring into the cooking apparatus, and then returns the flavoring receiving cup 54 to the tray 56.

Figure 5:
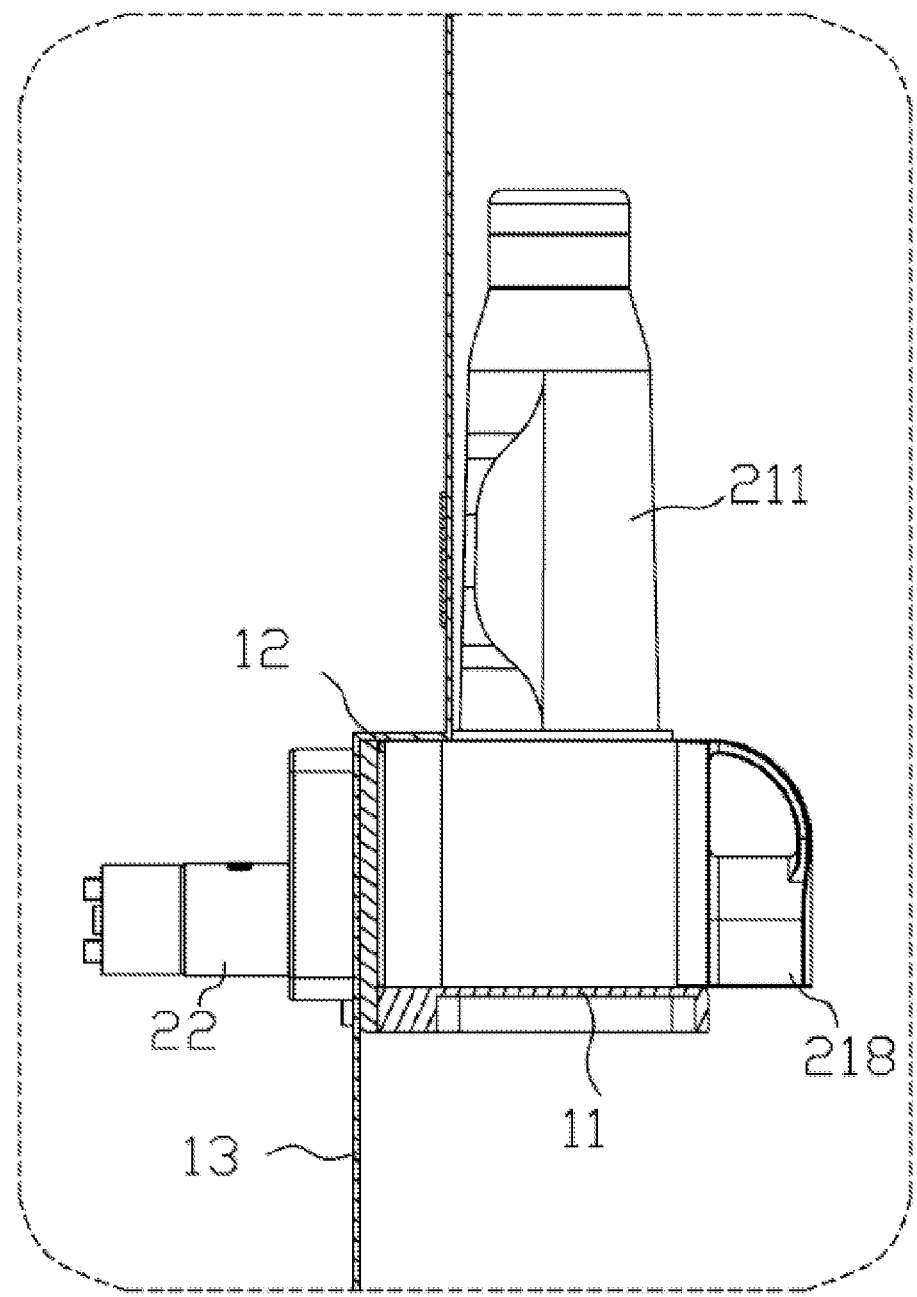
FIG. 5 is a partial sectional view of the solid flavoring means of the invention.

As shown in FIGS. 5 and 6, in another embodiment, the frame 10 is provided with a first lateral plate 11 and a second lateral plate 12 that are parallel with each other, the solid flavoring module 21 is clamped between the first lateral plate 11 and the second lateral plate 12, and a riser plate 13 perpendicular to the first lateral plate 11 and the second lateral plate 12 is further provided between the first lateral plate 11 and the second lateral plate 12; the solid flavoring module 21 and the first drive device 22 are separated at two sides of the riser plate 13, and the riser plate 13 is provided with a shaft hole 14 for abutting the solid flavoring module 21 with the first drive device 22. The first lateral plate 11 and the second lateral plate 12 clamp the solid flavoring module 21, and cooperate with the riser plate 13 to fix the abutment portion of the solid flavoring module 21 and the first drive device 22 so that the solid flavoring module 21 is stably assembled onto the frame 10, thus improving the reliability of detachably connecting the solid flavoring module 21 to the frame 10.

In this embodiment, an elastic telescopic sliding element 15 is provided at a portion where the first lateral plate 11 contacts with the solid flavoring module 21, and the elastic telescopic sliding element 15 is disposed on the first lateral plate 11 and/or at the bottom of the solid flavoring module 21. On the basis of clamping and fixing the solid flavoring module 21 by the first lateral plate 11 and the second lateral plate 12, the elastic telescopic sliding element 15 enables the solid flavoring module 21 and the second lateral plate 12 to be better abutted, thus reinforcing a clamping effect.

As shown in FIG. 2, in another embodiment, each of the solid flavoring means 20 is provided with a label for recording flavoring information, the frame 10 is provided with a scanning unit 80 for acquiring the flavoring information on the label, and a displacement unit 90 for driving the scanning unit 80 to move, and the scanning unit 80 and the displacement unit 90 are communicatively connected with the control unit 40 respectively.

In this embodiment, the displacement unit 90 comprises a displacement support 91 and the third drive device 23, the scanning unit 80 is fixed on the displacement support 91, the third drive device 23 drives the scanning unit 80 to move and simultaneously drives the first flavoring receiving device 52 to slide. The scanning unit 80 transmits the information recorded on the label to the control unit 40 which, considering user's operation information that is received, controls a designated solid flavoring means 20 to discharge flavoring, whereas at the same time, the first flavoring receiving means 51 is located right below the outlet of the designated solid flavoring means 20 and is ready for receiving flavoring. By scanning the label on the solid flavoring means 20 which records flavoring information using the scanning unit 80, the control unit 40 can accurately grasp information on the flavoring contained in the solid flavoring means 20 in real time so that the reliability of accurately discharging solid flavoring is improved. Of course, the displacement support 91 can be also driven by another drive device, and does not share the third drive device 23 with the first flavoring receiving device 51. The specific structure for realizing this is not discussed at length herein.

Similarly, like the solid flavoring means 20, when there are a plurality of liquid flavoring means 30, each of the liquid flavoring means 30 is provided with a label for recording flavoring information, the frame 10 is provided with a scanning unit 80 for acquiring the flavoring information on the label, and a displacement unit 90 for driving the scanning unit 80 to move, and the scanning unit 80 and the displacement unit 90 are communicatively connected with the control unit 40 respectively. After the control unit 40 receives corresponding scanning information, designated liquid flavoring can be accurately discharged when user's operation information is considered.

As shown in FIGS. 1 and 2, in another embodiment, there are a plurality of liquid flavoring means 30, and the arrangement of them on the frame 10 is similar to that of the solid flavoring means 20. A detailed description is not repeated herein. The flavoring receiving unit 50 has a second flavoring receiving device 52 for receiving liquid flavoring. Of course, the way how the liquid flavoring means 30 receives flavoring can be also the same as the way how the solid flavoring means 20 receives flavoring. For the specific structure for realizing this, reference can be made to the sliding flavoring receiving structure of the first flavoring receiving device 51.

In this embodiment, another preferred way of feeding flavoring is used: concentrated feeding. Specifically, with reference to FIG. 2, the liquid flavoring means 30 has a liquid delivering unit which comprises a liquid flavoring pipe 60, a gas pump 61, a first control valve 62, a first liquid pump 63, a liquid outlet 34 and a second control valve 64. The liquid flavoring pipe 60 is the passage for delivering liquid flavoring, and the outlets 318 of liquid flavorings are sequentially communicated to a middle section of the liquid flavoring pipe 60. That is, the discharged flavorings from all the liquid flavoring means 30 are transferred using the liquid flavoring pipe 60. The gas pump 61 is connected to a front section of the liquid flavoring pipe 60 through the first control valve 62. The gas pump 61 and the first control valve 62 are communicatively connected to the control unit 40 respectively, and operate under the control of the control unit 40. The gas pump 61 can feed gas into the liquid flavoring pipe 60 so that the liquid flavoring entering the liquid flavoring pipe 60 can be delivered to a rear section of the liquid flavoring pipe 60 more quickly and more thoroughly. An input end of the first liquid pump 63 is connected to the rear section of the liquid flavoring pipe 60, and is communicatively connected to the control unit 40. The first liquid pump 63 draws liquid flavoring entering the liquid flavoring pipe 60 and discharges it through an output end. The liquid outlet 34 is the outlet of the liquid delivering unit and is connected to the output end of the first liquid pump 63 through the second control valve 64. A control end of the second control valve 64 is connected to the control unit 40. When the second control valve 64 is opened, the first liquid pump 63 can pump liquid flavoring out.

The flavoring receiving unit 50 is provided with a second flavoring receiving device 52 which is disposed at a position below the liquid outlet 34. The second flavoring receiving device 52 and the first flavoring receiving device 51 are independent from each other, and are used for containing different flavorings. Specifically, in operation, the control unit 40 controls the valve 314 inside a corresponding liquid flavoring means 30 to open, and the first liquid pump 63 is simultaneously activated. Liquid flavoring in the liquid flavoring means 30 enters the liquid flavoring pipe 60, and the second control valve 64 is opened. Liquid flavoring flows out through the second control valve 64 and falls into the second flavoring receiving device 52. At this moment, the gas pump 61 is activated, and the first control valve 62 is simultaneously opened. Gas is pumped in from a side of the liquid flavoring pipe 60, and liquid flavoring in the liquid flavoring pipe 60 is thoroughly pushed to the liquid outlet 34 and discharged.

In this embodiment, at least one solid flavoring means 20 is further provided above the second flavoring receiving device 52, and solid flavoring in this solid flavoring means 20 can fall into the second flavoring receiving device 52. This additionally provided solid flavoring means 20 can further add designated solid flavoring into the second flavoring receiving device 52 so as to realize a function of mixing different flavorings, especially a mixing of solid flavoring and liquid flavoring.

As shown in FIG. 3b, in this embodiment, the second flavoring receiving device 52 comprises a flavoring receiving cup 54, a rotating base 58 and a fourth drive device (not shown), the flavoring receiving cup 54 is disposed on the rotating base 58, and the fourth drive device drives the rotating base 58 to rotate. The fourth drive device is preferably an electric motor which drives the rotating base 58 to rotate. The rotating base 58 in turn drives the flavoring receiving cup 54 to rotate, thus facilitating a sufficient mixing of different flavorings in the flavoring receiving cup 54 of the second flavoring receiving device 52.

As shown in FIG. 2, in another embodiment, during the automatic dosing process, clean water is required to be added in some cases. Therefore, the automatic dosing device of the invention is further provided with a water supplying unit. Specifically, the liquid delivering unit further comprises a water inlet 651 and a third control valve 66, wherein the water inlet 651 is connected to a front section of the liquid flavoring pipe 60 via the third control valve 66, and a control end of the third control valve 66 is connected to the control unit 40. That is, a water inflow branch 65 is further provided at the front section of the liquid flavoring pipe 60, and the third control valve 66 is provided in the water inflow branch 65. Like the process of delivering liquid flavoring, the liquid delivering unit can deliver a suitable volume of water to the liquid outlet 34 to thereby add a suitable volume of clean water to the second flavoring receiving device 52. The clean water can be used for diluting liquid flavoring, and also be used for mixing and agitating solid flavoring added from the solid flavoring means 20. For example, when the solid flavoring stored in the solid flavoring means placed above the second flavoring receiving device 52 is starch, after the starch is added into the second flavoring receiving device 52, a suitable volume of clean water is then added. A rotation mixing function of the second flavoring receiving device 52 itself can agitate the clean water and starch sufficiently so as to realize a real-time formulating of water starch, thus solving the problem that water starch can not be easily stored and is prone to settling down.

The water inflow branch 65 is also provided at the front section of the liquid flavoring pipe 60, and an automatic cleaning function can be also realized for the liquid delivering unit. That is, the income water can be used to clean the pipe and relevant components, thus preventing flavorings from accumulating to generate scales which will affect service life and hygiene safety.

In this embodiment, a waste liquid opening 68 and a fourth control 67 are further sequentially arranged at a rear section of the liquid flavoring pipe 60, and the waste liquid opening 68 is in communication with an output end of the first liquid pump 63 via the fourth control valve 67. In order to prevent the waste liquid from being discharged directly from the liquid outlet so as to affect use, when it is required to discharge waste liquid flavor or when it is required to perform cleaning, the fourth control valve 67 is opened, the second control valve 64 is closed, the liquid outlet 34 is sealed, and waste liquid flows out from the waste liquid opening 68.

In this embodiment, the first liquid pump 63 is preferably a plunger pump which can meter the volume of pumped liquid flavoring, and accurately calculate the volume of liquid flavoring.

In the above concentrated way to deliver liquid flavoring and clean water using the liquid delivering unit, various liquid flavorings can be mixed. When edible oil is also delivered using the above unit, the edible oil will mix with other flavorings or water, and a sputtering phenomenon will occur during the heating process, which will severely affect the safety in cooking. Therefore, an edible oil delivering unit is further independently provided in the automatic dosing device of the invention. As shown in FIG. 2, the automatic dosing device of the invention further comprises an oil pipe 70 for delivering edible oil, and the flavoring receiving unit 50 has a third flavoring receiving device 53 for receiving edible oil. A second liquid pump 71 and a fifth control valve 72 are sequentially arranged on the oil pipe 70, and the second liquid pump 71 is a plunger pump or a gear pump.

The edible oil delivering unit comprises an oil inlet 74, the second liquid pump 71, the fifth control valve 72, an oil outlet 73 and the oil pipe 70. The oil inlet 74 and the oil outlet 73 are placed at two ends of the oil pipe 70 respectively. The second liquid pump 71 and the fifth control valve 72 are sequentially connected to the oil pipe 70 between the oil inlet 74 and the oil outlet 73 in series, and the control ends of the second liquid pump 71 and the fifth control valve 72 are connected to the control unit 40. The flavoring receiving unit 50 is provided with a third flavoring receiving device 53 which is placed at a position below the oil outlet. In operation, the oil inlet 74 is connected to an external oil supplying mechanism. The control unit 40 controls the action of the second liquid pump 71, and the fifth control valve 72 is opened. The second liquid pump 71 draws edible oil in the oil supplying mechanism to the oil pipe 70, and the edible oil flows into the third flavoring receiving device 53 via the oil outlet 73 after passing through the fifth control valve 72. The position of the third flavoring receiving device 53 is fixed on the frame 10, and a flavoring receiving cup of the third flavoring receiving device 53 can be separated from the frame 10 so as to facilitate placing and taking edible oil. Such a way of using an independent edible oil delivering unit to deliver edible oil avoids mixing edible oil with other flavorings or water so that the edible oil will not have a sputtering phenomenon when being heated, thus greatly increasing the safety.

In another embodiment, the automatic dosing device of the invention uses the control unit 40 to automatically control the actions of the solid flavoring means 20 and the liquid flavoring means 30 so as to realize automatic flavoring discharge. However, in some cases, it is required for the user to take the flavoring manually. Therefore, the frame 10 of the device is further provided with a manual switch for controlling actions of the solid flavoring means 20 and/or the liquid flavoring means 30, and the manual switch is communicatively connected to the control unit 40. Taking the solid flavoring means as an example, in this embodiment, the manual switches are used for controlling actions of the solid flavoring means 20, and the number of the manual switches is the same as the number of the solid flavoring means 20 that are required to be controlled manually. The manual switches are distributed at positions below each solid flavoring means 20. When it is required for the user to discharge flavoring from a certain solid flavoring means 20, he/she only has to operate a corresponding manual switch. In other embodiments, the above manual switch can be also replaced by a sensing switch.

The above described merely shows preferred embodiments of the invention, and does not limit the invention. For those skilled in the art, the invention can be modified and changed in various ways. Any modification, equivalent substitute, improvement or the like made within the spirit and principle of the invention will fall within the scope of protection of the invention.

The invention claimed is:

1. An automatic dosing device, comprising a frame on which are disposed a flavoring unit, a flavoring receiving unit and a control unit, the flavoring unit comprising a solid flavoring mechanism and a liquid flavoring mechanism, wherein:

the solid flavoring mechanism comprises a solid flavoring module and a first drive device, the solid flavoring module being detachably drivingly connected to the first drive device, the first drive device being fixed on the frame and being communicatively connected with the control unit; wherein the solid flavoring module comprises a first flavoring bottle and a first base that are in communicative abutment with each other, a flavoring pushing device being provided in the first base and being detachably drivingly connected to the first drive device; wherein when driven by the first drive device, the flavoring pushing device delivers solid flavoring to an outlet of the solid flavoring mechanism;

the liquid flavoring mechanism comprises a liquid flavoring module and a second drive device, the liquid flavoring module being detachably drivingly connected to the second drive device, the second drive device being fixed on the frame and being communicatively connected with the control unit; wherein the liquid flavoring module comprises a second flavoring bottle and a second base that are in communicative abutment with each other, a liquid passage, a valve and a drive rod are provided inside the second base, wherein the drive rod is detachably drivingly connected to the second drive device and drives the valve to operate so as to control on-off of the liquid passage; and wherein the flavoring receiving unit receives flavorings from the solid flavoring mechanism and the liquid flavoring mechanism, respectively.

2. The automatic dosing device according to claim 1, wherein a power input shaft of the flavoring pushing device includes a first abutment piece, a power output shaft of the first drive device includes a second abutment piece, and the first abutment piece and the second abutment piece are detachably abutted with each other.

3. The automatic dosing device according to claim 2, wherein one of the first abutment piece and the second abutment piece is a rotating shaft having an external spline, wherein the other of the first abutment piece and the second abutment piece is a sleeve having an internal spline, and wherein the rotating shaft and the sleeve are detachably sleeved over each other.

4. The automatic dosing device according to claim 1, wherein the first base includes an agitating cavity and a pushing cavity, the flavoring pushing device comprises an agitating element and a helical pusher, the agitating element being located in the agitating cavity, the helical pusher being located in the pushing cavity, the agitating cavity being in communication with the first flavoring bottle, and the pushing cavity being in communication with the agitating cavity; and wherein solid flavoring enters the agitating cavity from the first flavoring bottle, and enters the pushing cavity after being agitated and dispersed by the agitating element; and wherein in the pushing cavity, when pushed by the helical pusher, the solid flavoring is delivered to the outlet of the solid flavoring mechanism.

5. The automatic dosing device according to claim 4, wherein a coupling member is located between the agitating element and the helical pusher, the coupling member being in the form of gear transmission or belt transmission.

6. The automatic dosing device according to claim 4, wherein the pushing cavity has a columnar shape structure that mates with a shape of the helical pusher; wherein an outer edge of the helical pusher is close to an inner wall of the pushing cavity, and wherein the outer edge and the inner wall are in a tangent relationship.

7. The automatic dosing device according to claim 1, wherein a mouth section at the bottom of the first flavoring bottle is detachably and rotatably snap-fitted to a base socket of the first base, wherein a projecting strip is disposed circumferentially on an outside face of the mouth section, and a positioning rib is disposed at an end of the projecting strip;

wherein an L-shaped snapping slot is included in the base socket, the L-shaped snapping slot comprising an axial portion and a circumferential portion, the axial portion extending from the edge of the base socket in a direction in which the mouth section is inserted into the base socket, and the circumferential portion extending from a side face edge of the axial portion in a circumferential direction of the base socket;

such that when the mouth section rotates and snap-fits with the base socket, the projecting strip screws into the circumferential portion of the L-shaped snapping slot; and when the mouth section rotates and firmly snap-fits with the base socket, the positioning rib abuts against the side face edge of the circumferential portion of the L-shaped snapping slot.

8. The automatic dosing device according to claim 1, wherein the frame is fixedly provided with a quick release joint for communicative insertion connection with an outlet of the liquid flavoring mechanism.

9. The automatic dosing device according to claim 8, wherein the drive rod includes a third abutment member, the second drive device includes a fourth abutment member, and the third abutment member and the fourth abutment member are detachably abutted with each other.

10. The automatic dosing device according to claim 9, wherein the third abutment member is disposed at a bottom portion of the second base, and the outlet of the liquid flavoring mechanism faces a back side of the second base; and wherein when the outlet of the liquid flavoring mechanism is insertedly connected to the quick release joint, the third abutment member and the fourth abutment member mate and abut with each other.

11. The automatic dosing device according to claim 10, wherein the third abutment member is a C-shaped pulling hook, the fourth abutment member is a T-shaped pulling disc, and the T-shaped pulling disc is detachably embeddedly disposed in a C-shaped slot of the C-shaped pulling hook; and wherein a direction in which the T-shaped pulling disc is embedded into the C-shape pulling hook is consistent with a direction in which the outlet of the liquid flavoring is insertedly connected with the quick release joint.

12. The automatic dosing device according to claim 1, wherein the second drive device is a push-pull electromagnet, wherein an end of the drive rod is detachably drivingly connected to the push-pull electromagnet, and wherein the other end of the drive rod is fixedly connected to the valve.

13. The automatic dosing device according to claim 1, wherein the second flavoring bottle and the second base are in detachable sealing screw snap-fit connection, and wherein an elastic washer is provided at the snap-fit portion of the second flavoring bottle and the second base.

14. The automatic dosing device according to claim 1, wherein there are a plurality of the solid flavoring mechanisms, the flavoring receiving unit has a first flavoring receiving device for receiving solid flavoring, and wherein the first flavoring receiving device is slidably disposed on the frame.

15. The automatic dosing device according to claim 14, wherein a third drive device is disposed on the frame, and the third drive device drives the first flavoring receiving device to slide on a sliding track.

16. The automatic dosing device according to claim 15, wherein the first flavoring receiving device comprises a flavoring receiving cup, a bracket and a tray such that the bracket slides on the sliding track when driven by the third drive device, wherein the tray is disposed on the bracket, and wherein the flavoring receiving cup is disposed in the tray.

17. The automatic dosing device according to claim 16, wherein a metering module is provided between the tray and the bracket, and the tray and the bracket are arranged in clearance fit; wherein when there is no flavoring in the flavoring receiving cup, the bottom of the tray does not contact the metering module.

18. The automatic dosing device according to claim 15, wherein the solid flavoring mechanism are arranged in a linear array in a horizontal direction or in an arc array in a horizontal plane on the frame, wherein the arrangement of the sliding track on the frame mates with the arrangement of the solid flavoring mechanism.

19. The automatic dosing device according to claim 15, wherein the first flavoring receiving device has an initial position on the sliding track, and a sensor for detecting the position of the first flavoring receiving device is disposed at the initial position.

20. The automatic dosing device according to claim 14, wherein the frame includes a first lateral plate and a second lateral plate, the first and second lateral plates being parallel with each other, the solid flavoring module being clamped between the first lateral plate and the second lateral plate, and a riser plate perpendicular to the first lateral plate and the second lateral plate is disposed between the first lateral plate and the second lateral plate;
wherein the solid flavoring module and the first drive device are separated at two sides of the riser plate, and the riser plate defines a shaft hole for abutting the solid flavoring module with the first drive device.

21. The automatic dosing device according to claim 20, wherein an elastic telescopic sliding element is disposed at a portion where the first lateral plate contacts the solid flavoring module, and wherein the elastic telescopic sliding element is disposed on the first lateral plate and/or at the bottom of the solid flavoring module.

22. The automatic dosing device according to claim 15, wherein each of the solid flavoring mechanisms includes a label for recording flavoring information, the frame includes a scanning unit for acquiring the flavoring information on the label, and a displacement unit for driving the scanning unit to move, wherein the scanning unit and the displacement unit are communicatively connected with the control unit, respectively.

23. The automatic dosing device according to claim 22, wherein the displacement unit comprises a displacement support and the third drive device, wherein the scanning unit is fixed on the displacement support, and wherein the third drive device drives the scanning unit and the first flavoring receiving device to move synchronously.

24. The automatic dosing device according to claim 1, comprising a plurality of liquid flavoring mechanisms, wherein the flavoring receiving unit has a second flavoring receiving device for receiving liquid flavoring, wherein the liquid flavoring mechanism delivers liquid flavoring into the second flavoring receiving device through a liquid flavoring pipe;
wherein a gas pump and a first control valve are sequentially arranged at a front section of the liquid flavoring pipe; the outlet of each liquid flavoring mechanism is in communication with a middle section of the liquid flavoring pipe, respectively; and wherein a first liquid pump and a second control valve are sequentially arranged at a rear section of the liquid flavoring pipe.

25. The automatic dosing device according to claim 24, wherein at least one of said solid flavoring mechanisms is further disposed above the second flavoring receiving device, and wherein solid flavoring in the solid flavoring mechanism can fall into the second flavoring receiving device.

26. The automatic dosing device according to claim 25, wherein the second flavoring receiving device comprises a flavoring receiving cup, a rotating base and a fourth drive device, the flavoring receiving cup being disposed on the rotating base, and wherein the fourth drive device drives the rotating base to rotate.

27. The automatic dosing device according to claim 24, wherein a water inflow branch is further included at the front section of the liquid flavoring pipe, and a third control valve is included in the water inflow branch.

28. The automatic dosing device according to claim 24, wherein a waste liquid opening and a fourth control valve are sequentially arranged at a rear section of the liquid flavoring pipe, and wherein the waste liquid opening communicates with an output end of the first liquid pump via the fourth control valve.

29. The automatic dosing device according to claim 24, wherein the first liquid pump is a plunger pump.

30. The automatic dosing device according to claim 24, wherein each of the liquid flavoring mechanism includes a label for recording flavoring information, the frame includes a scanning unit for acquiring the flavoring information on the label, and a displacement unit for driving the scanning unit to move, and wherein the scanning unit and the displacement unit are communicatively connected with the control unit, respectively.

31. The automatic dosing device according to claim 1, further comprising an oil pipe for delivering edible oil, and wherein the flavoring receiving unit has a third flavoring receiving device for receiving the edible oil; wherein the automatic dosing device further comprises a second liquid pump and a fifth control valve are sequentially arranged on the oil pipe, and wherein the second liquid pump is a plunger pump or a gear pump.

32. The automatic dosing device according to claim 1, wherein the frame includes a manual switch or a sensing switch for controlling actions of the solid flavoring mechanism and/or the liquid flavoring mechanism, wherein the manual switch or the sensing switch is communicatively connected to the control unit.

* * * * *